United States Patent
Zeira

(10) Patent No.: US 7,145,874 B2
(45) Date of Patent: Dec. 5, 2006

(54) APPARATUS, METHOD, AND SOFTWARE FOR LIMITING SESSION RATES IN A COMPUTER NETWORK

(75) Inventor: Assaf Zeira, Shoham (IL)

(73) Assignee: P-Cube Ltd., Hertzliya (IL)

( * ) Notice: Subject to any disclaimer, the term of this patent is extended or adjusted under 35 U.S.C. 154(b) by 1068 days.

(21) Appl. No.: 10/085,017

(22) Filed: Mar. 1, 2002

(65) Prior Publication Data

US 2003/0165156 A1    Sep. 4, 2003

(51) Int. Cl.
*H04J 1/16* (2006.01)

(52) U.S. Cl. ..................... 370/230; 370/465

(58) Field of Classification Search ............... 370/230, 370/231, 232, 235, 352, 349, 465, 230.1, 370/229, 252, 389, 390, 391, 392, 400, 411; 709/232, 224, 225, 229, 239; 713/154, 170
See application file for complete search history.

(56) References Cited

U.S. PATENT DOCUMENTS

| | | | |
|---|---|---|---|
| 5,732,078 A | 3/1998 | Arango | |
| 5,864,541 A | 1/1999 | Abu-Amara et al. | |
| 5,898,837 A | 4/1999 | Guttman et al. | |
| 5,914,945 A | 6/1999 | Abu-Amara et al. | |
| 5,946,302 A | 8/1999 | Waclawsky et al. | |
| 5,956,721 A | 9/1999 | Douceur et al. | |
| 5,995,488 A | 11/1999 | Kalkunte et al. | |
| 5,995,971 A | 11/1999 | Douceur et al. | |
| 6,105,064 A | 8/2000 | Davis et al. | |
| 6,134,217 A | 10/2000 | Stiliadis et al. | |
| 6,185,187 B1 | 2/2001 | Ghanwani et al. | |
| 6,205,479 B1 * | 3/2001 | Dulai et al. ................. | 709/225 |
| 6,839,767 B1 * | 1/2005 | Davies et al. ............... | 709/232 |

* cited by examiner

*Primary Examiner*—Chi Pham
*Assistant Examiner*—Alexander O. Boakye
(74) *Attorney, Agent, or Firm*—Abelman, Frayne & Schwab

(57) ABSTRACT

A method of controlling a number of sessions established on a communication network is provided. In the method, at least a first data packet transmitted on the communication network is input, and a new session corresponding to the at least the first data packet is determined. The new session is requested by at least a first user who has an account authorizing the establishment of sessions on the communication network. Also, the method determines if a creation of the new session would exceed a permitted usage of the communication network, and the permitted usage corresponds to the account. If the creation of the new session would exceed the permitted usage, the creation of the new session is prevented. On the other hand, if the creation of the new session would not exceed the permitted usage, the creation of the new session is allowed. Also, a system that performs the method and a software program that instructs the system to perform the method are also provided.

60 Claims, 5 Drawing Sheets

APPARATUS, METHOD, AND SOFTWARE FOR LIMITING SESSION RATES IN A COMPUTER NETWORK

FIELD OF THE INVENTION

The present invention generally relates to a data communications network. More particularly, the present invention relates to an apparatus, method, and software that control the rate at which a user creates sessions on the network.

BACKGROUND OF THE INVENTION

Today, users can access many types of data communications networks (e.g. the Internet, an asynchronous transfer mode ("ATM") network, a local area network ("LAN"), a wide area network ("WAN"), etc.) to transmit data across the networks and receive data through the networks. For example, the Internet comprises a network interconnecting many nodes, and voice, video, graphics, text, and other data are often exchanged between the various nodes over the network. In a typical scenario, a user inputs a command to a personal computer ("PC") to instruct the personal computer to establish a connection with an Internet Service Provider ("ISP") located at a particular node (i.e. an ISP node) of the network. The PC may establish such a connection with the ISP node via a modem, a digital subscriber line ("DSL"), a T1 line, etc. Once the connection is established, the user can input various commands to his or her PC to transmit and receive data over the Internet via the ISP node.

When the user transmits data over the Internet, he or she generally needs to directly or indirectly specify a destination address of the destination node to which the information is intended to be delivered. For example, if the user would like to send an electronic mail ("e-mail") message to a particular person, he or she must specify the email address of the destination node at which the particular person accesses e-mail. On the other hand, when the user would like to receive data from the Internet, he or she generally needs to directly or indirectly specify a source address of the source node from which the information is to be retrieved. For example, if the user would like to access a web site of a particular company, he or she can specify the HyperText Transfer Protocol ("HTTP") address corresponding to the source node on which the web site is stored. Alternatively, the user can select a "link," which identifies the web site and which is generated via an Internet browser software program contained on the user's PC.

The user can also input commands to the PC to instruct the ISP to establish a connection between the ISP node and another node of the network so that full application level communications can be performed between the nodes. One example of such communications is a video conferencing application in which video and audio data are transmitted between the nodes. In order to establish a full application level communication, multiple sessions or process flows must be initiated between the nodes, including various ports of the nodes, to enable the proper transfer of data. In one implementation, a session is a request to open a file transfer protocol ("FTP") application that results in the creation of several additional sessions or process flows. Moreover, a session may open child sessions to any level necessary.

At any given time, the number of sessions that are generated by the ISP node is random, depending on the number of users that would like to establish communications via the ISP node and depending on the times that the users desire such communications. Moreover, since the establishment of one session results the in creation of additional sessions, which in turn, may result in the creation of yet additional sessions, the number of sessions directly or indirectly created by a user tends to occur in bursts when the user requests an initial session to be created. In particular, for each burst, several sessions are initially opened in order to accommodate the desired application. Then, as the application reaches its conclusion, the number of sessions decreases until there are no more active sessions.

For example, FIG. 1 graphically illustrates a scenario in which a first user (i.e. user 1) and a second user (i.e. user 2) request various sessions to be created. As shown in the figure, the requests for and creations of sessions occur in bursts that increase and decrease over time. Also, between such bursts, periods of time exist in which there is no session activity.

As the number of users increases, the burst pattern of the sessions generated by an ISP node evolves into a more stable pattern, due to the random numbers and random times that the sessions are generated. For example, FIG. 2 graphically illustrates the number of sessions generated by an ISP node that is utilized by a company that has a relatively large number of users. As shown in the figure, the average number of activated sessions in the ISP node at any given time is approximately thirty, the maximum number of activated sessions is approximately thirty nine, and the minimum number of activated sessions is approximately twenty two.

The number of sessions opened or activated by each user, as well as the number of sessions opened or activated by an organization, is of interest to the ISP. However, efficiently monitoring and controlling the number of sessions activated by a specific company, organization, or user is difficult. Accordingly, an organization with multiple users can defraud the ISP relatively easily by registering the organization with the ISP via a single user account and paying low access rates that are determined based on bandwidth usage of the average single user. Then, the multiple users of the organization can activate a large number of sessions and utilize bandwidth that greatly exceeds the sessions activated and bandwidth consumed by an average single user. Moreover, when a burst of sessions created by the multiple users of the organization starts, the ISP generally has no choice but to handle the burst, regardless of the level of service actually ordered by the organization.

SUMMARY OF THE INVENTION

An illustrative, non-limiting embodiment of the invention relates to a method of controlling a number of sessions established on a communication network. In one implementation, the method comprises: (a) inputting at least a first data packet transmitted on the communication network; (b) determining a new session corresponding to the at least the first data packet, wherein the new session is requested by at least a first user and wherein the at least the first user has an account authorizing the at least the first user to establish sessions on the communication network; (c) determining if a creation of the new session would exceed a permitted usage of the communication network, wherein the permitted usage corresponds to the account; (d) if the creation of the new session would exceed the permitted usage, preventing the new session from being created; and (e) if the creation of the new session would not exceed the permitted usage, allowing the new session to be created.

Another illustrative, non-limiting embodiment of the invention relates to a software program contained on a computer readable medium for controlling a number of sessions established on a communication network. In one implementation, the software program includes instructions to instruct a controller to perform a routine comprising: (a) inputting at least a first data packet transmitted on the communication network; (b) determining a new session corresponding to the at least the first data packet, wherein the new session is requested by at least a first user and wherein the at least the first user has an account authorizing the at least the first user to establish sessions on the communication network; (c) determining if a creation of the new session would exceed a permitted usage of the communication network, wherein the permitted usage corresponds to the account; (d) if the creation of the new session would exceed the permitted usage, preventing the new session from being created; and (e) if the creation of the new session would not exceed the permitted usage, allowing the new session to be created.

Yet another illustrative, non-limiting embodiment of the invention relates to a system for controlling a number of sessions established on a communication network. In one implementation, the system comprises: an interface and a controller. The interface inputs at least a first data packet transmitted on the communication network, and the controller receives the at least the first data packet. Also, the controller determines a new session corresponding to the at least the first data packet. The new session is requested by at least a first user and wherein the at least the first user has an account, which is at least indirectly set up with the controller and which authorizes the at least the first user to establish sessions on the communication network. In addition, the controller determines if a creation of the new session would exceed a permitted usage of the communication network, wherein the permitted usage corresponds to the account. If the creation of the new session would exceed the permitted usage, the controller prevents the new session from being created. On the other hand, if the creation of the new session would not exceed the permitted usage, the controller allows the new session to be created.

BRIEF DESCRIPTION OF THE DRAWINGS

Various aspects of illustrative, non-limiting embodiments of the present invention will become more apparent by describing them with reference to the attached drawings in which.

DETAILED DESCRIPTION OF THE ILLUSTRATIVE, NON-LIMITING EMBODIMENTS

The following description of non-limiting embodiments discloses specific configurations, features, and processes. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, features, and processes of the present invention that would have been known to one skilled in the art are omitted for the sake of clarity and brevity.

In addition, the embodiments described below contain illustrative examples of software programs, which may be written in any software language. Also, such programs may be contained in a read only memory ("ROM"), a random access memory ("RAM"), a floppy disk, a hard disk, an optical disk, a carrier wave (e.g. a carrier wave transmitted via the Internet, a vertical blanking interval of a television signal, etc.), or any other computer readable medium. Moreover, some of the software programs may be implemented entirely via software or a combination of hardware and software. Alternatively, some of the routines may be implemented entirely in hardware.

Figure 1:
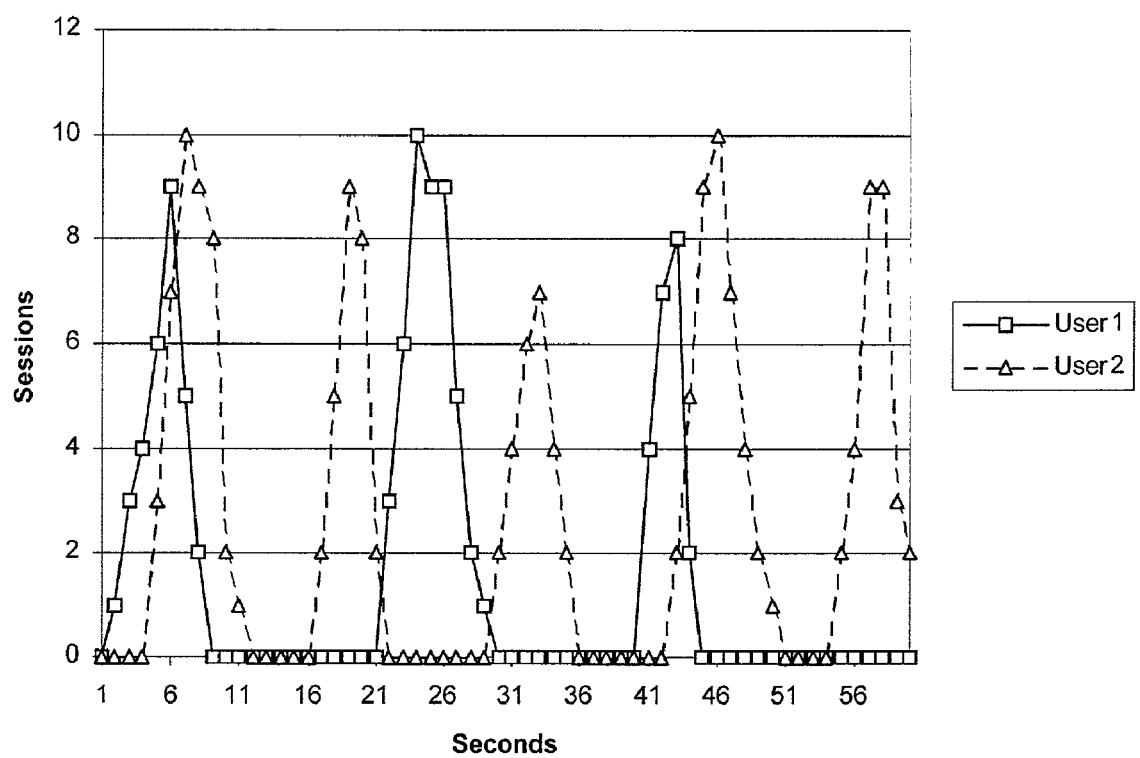
FIG. 1 shows an illustrative, non-limiting example of the number of network sessions generated by two users and the frequency with which such sessions are generated.
Figure 2:
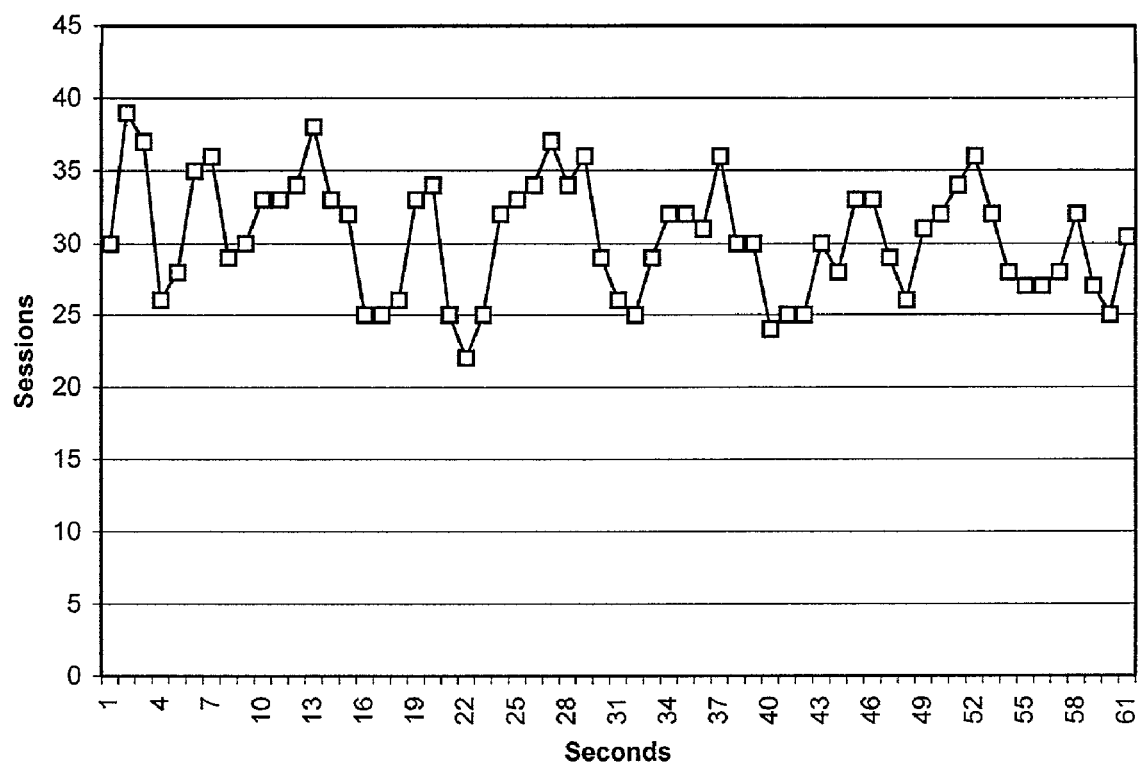
FIG. 2 shows an illustrative, non-limiting example of the number of network sessions generated by a relatively large number of users and the frequency with which such sessions are generated.
Figure 3:
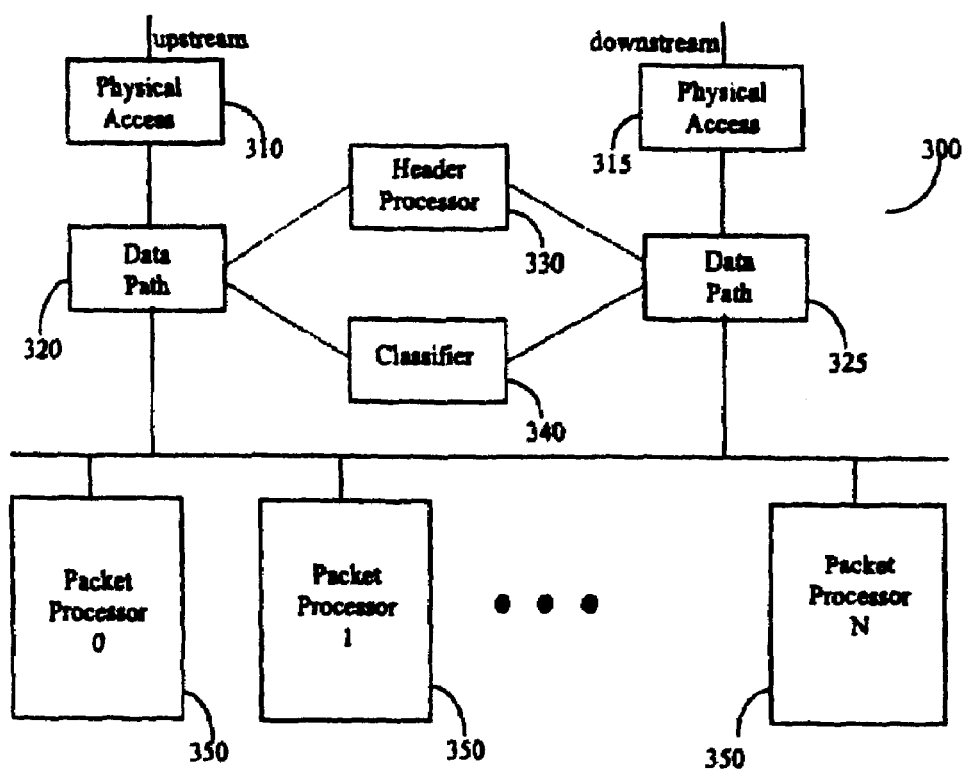
FIG. 3 shows an example of a process flow monitor and control system in accordance with an illustrative, non-limiting embodiment of the present invention.

FIG. 3 shows an example of a process flow monitor and control system 300 in accordance with an illustrative, non-limiting embodiment of the present invention. As shown in the figure, the system 300 comprises physical access units 310 and 315, data path units 320 and 325, a header processor 330, a classifier unit 340, and a plurality of packet processors 350.

In one implementation, the physical access unit 310 comprises standard layer one and layer two components. An example of the layer one component is a PHY unit, and an example of the layer two component is a MAC unit. The physical access unit 310 captures data packets flowing upstream from an ISP node to a source node (or from a destination node to the ISP node) during a full-duplex communication on the network. The physical access unit 315 is similar to the physical access unit 310, except that it captures the data packets flowing downstream from the source node to the ISP node (or from the ISP node to the destination node) during the full-duplex communication.

The upstream data packets captured by the physical access unit 310 are supplied to the data path unit 320, and the downstream data packets captured by the physical access unit 315 are supplied to the data path unit 325. Then, the header processor 330 and classifier unit 340 process the upstream and downstream data packets to determine which upstream and downstream data packets correspond to each other and to identify a process flow or session to which the upstream and downstream data packets belong. One manner of identifying the process flow or session of the data packets is to determine a particular rule or rules that the upstream and downstream data packets satisfy. When a process flow or session corresponding to a data packet is identified, the data packet is output to a certain one of the packet processors 350 to be processed.

In one implementation, the system 300 determines the particular rule or rules that correspond to a data packet by examining the Internet protocol ("IP") packet header (or IP tuple) of the data packet. In an illustrative example relating to Internet communications, the IP tuple contains several fields comprising a total of 104 bits. Specifically, the tuple comprises an IP source address field (32 bits), an IP destination address field (32 bits), a source port address field (16 bits), a destination port address field (16 bits), and a protocol type field (8 bits). The IP source and destination address fields respectively contain the source and destination addresses of the data packet. Also, the source and destination port address fields respectively identify the source port from which the data packet was transmitted and the destination port at which the data packet is to be received. Finally, the protocol type field identifies the type of data contained in the data packet.

By analyzing the some or all of the information in the IP tuple, the system 300 can determine the particular rule or rules to which the data packet belongs. By identifying the particular rule or rules, the system 300 can determine the session or process flow to which the data packet belongs and can determine whether or not to allow the session or process flow to continue.

A more detailed example of various aspects of the system 300 is described in U.S. application Ser. No. 09/541,598 entitled "An Apparatus for Wire-Speed Classification and Pre-Processing of Data Packets in a Full Duplex Network" ("the '598 application"). The '598 application was filed on Apr. 3, 2000, was assigned to the assignee of the present application, and is incorporated herein by reference in its entirety for all purposes.

In the present embodiment, the particular rules for classifying the data packets include rules to enable the monitoring and control of the rates at which sessions or process flows are generated. In one example, the system 300 identifies sessions as they are created and correlates them to certain process flows or other sessions. As a result, the system 300 can determine whether or not to allow a particular session or process flow to continue and consume valuable bandwidth of the system 300 or network. Such determination can be made based on certain conditions to control the rate at which specific users or organization create new sessions or process flows. In an illustrative implementation, the system 300 can be instructed to count the number of sessions generated by a user over a defined period of time.

Figure 4:
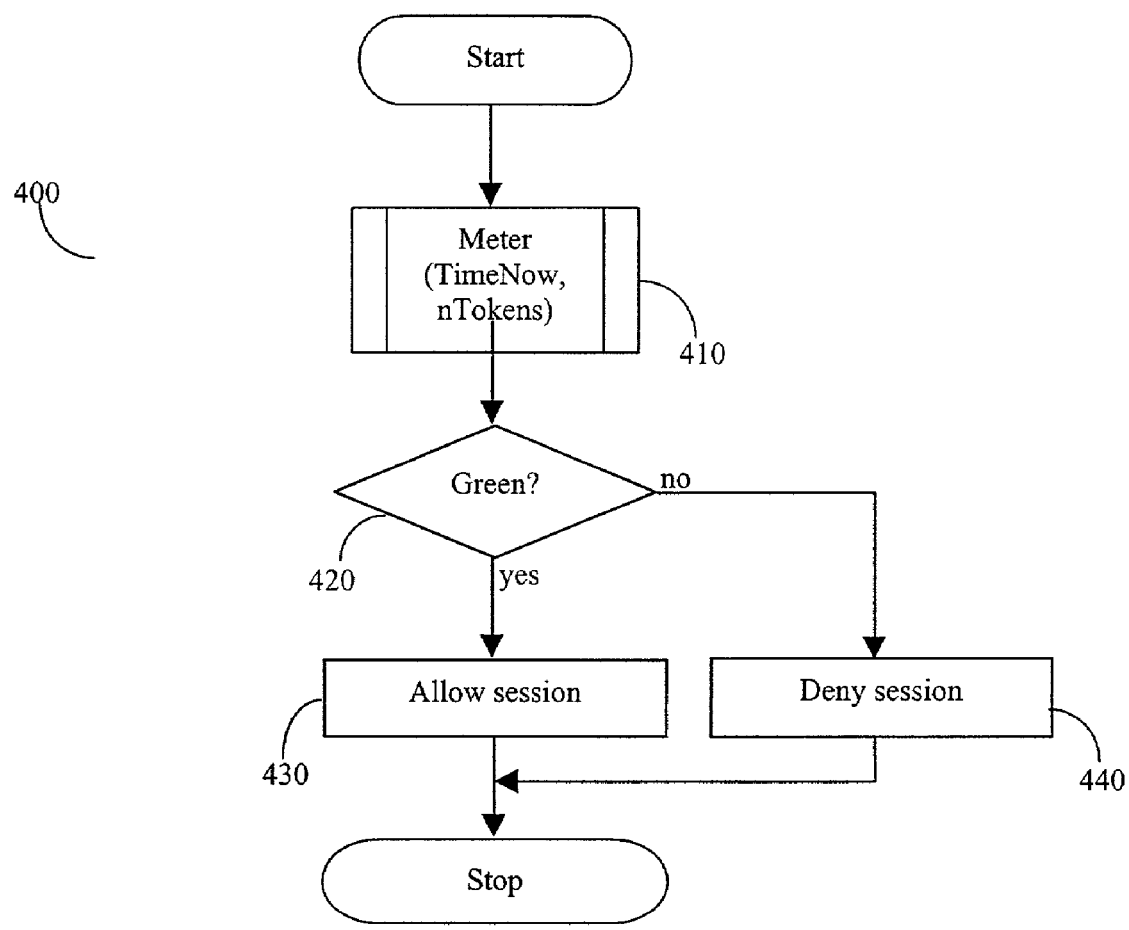
FIG. 4 shows an example of a flow chart of a routine for controlling the rate at which sessions are activated in accordance with an illustrative, non-limiting embodiment of the present invention.

FIG. 4 is an illustrative example of a flow chart 400 for monitoring and controlling sessions and process flows. As shown in the figure, operation 410 executes a subroutine (or meter) for determining whether or not the session or process flow is allowed to continue. The meter utilizes a variable "TimeNow" and a variable "nTokens". In one implementation, the instructions of flowchart 400 can be executed on the system 300. For example, they may be executed on the header processors 350 or one of the packet processors 350.

The variable "TimeNow" identifies the current time, and the variable "nTokens" indicates the number of "tokens" that are required for a user or organization to open a new session or process flow. Specifically, each user account or organization account for accessing the Internet via the ISP is provided with an available number of tokens based on the type of account. The available number of tokens at least indirectly corresponds to the rate at which a user or users of the account are allowed to create new sessions or process flows.

For example, the rate at which a single user activates or opens new sessions or process flows is relatively low. Thus, the available number of tokens assigned to a single user account would be relatively small. On the other hand, the rate at which a large number of users of a large organization activates or opens new sessions or process flows is relatively high. Thus, the available number of tokens assigned to a large organization account would be relatively large. Moreover, the cost of a user's or organization's account may correspond to the available number of tokens typically allocated to the account.

In one implementation of the present embodiment, the variable "nTokens" equals "1," indicating that one token is required to open a new session or process flow. However, in certain scenarios, one may prefer to require a larger number of tokens to open a single session. For instance, if the variable "nTokens" equals "10," ten tokens would be required to activate each session or process flow. If a multiple number of tokens (e.g. ten tokens) corresponds to a single session, the system 300 can be configured to monitor "lower-cost" sessions and deduct a smaller number of tokens (e.g. five tokens) from an account when such a "low-cost" session is created or opened. A "low-cost" session could be, but is not limited to, sessions having low bandwidth requirements, sessions with short lifetimes, and other sessions that utilize a relatively small amount of system resources. In such a scenario, the creation or opening of sessions can be monitored and controlled with a higher resolution or a finer granularity.

Furthermore, in other implementations, each type of session or process flow could be weighted based on (1) importance of the session, (2) the typical frequency with which the session occurs, (3) the required bandwidth of the session, etc. In such a scenario, different numbers of tokens may be required to create or open different sessions. Specifically, a larger number of tokens would be required to create a session with a higher weight than to create a session with a lower weight.

Figure 5:
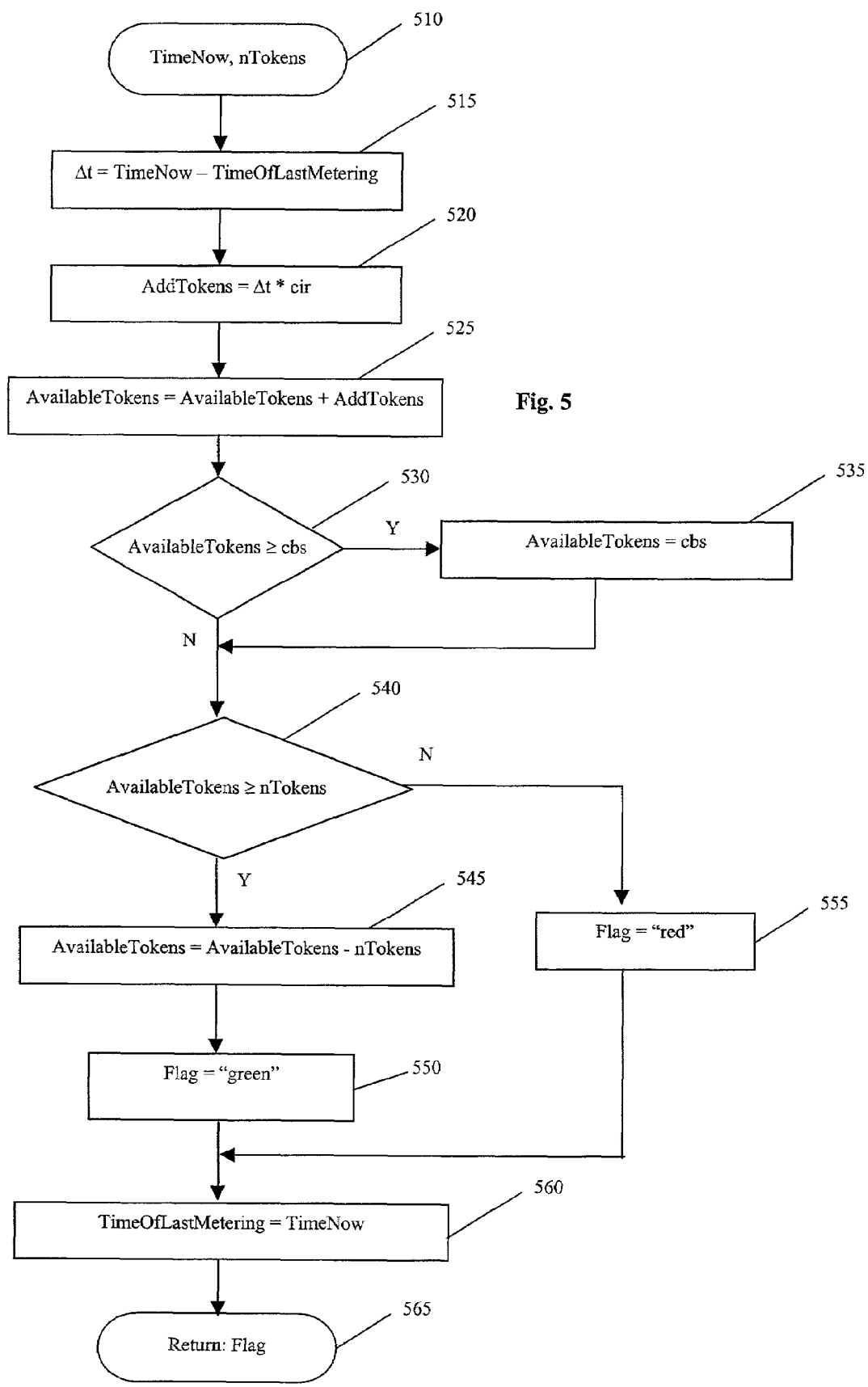
FIG. 5 shows an example of a flow chart of a routine for implementing a session rate meter in accordance with an illustrative, non-limiting embodiment of the present invention.

An illustrative, non-limiting example of the subroutine or meter contained in operation 410 is shown in the flow chart 500 in FIG. 5. As shown in the figure, the variables "TimeNow" and "nTokens" are received. (Operation 510). As described above, the variable "TimeNow" identifies the current time when the first data packet of the new session has entered the system 300, and the variable "nTokens" identifies the number of tokens required to create the new session.

Then, in operation 515, a variable "$\Delta t$" is calculated based on the variables "TimeNow" and "TimeOfLastMetering". The variable "TimeOfLastMetering" identifies the time when the first data packet of the previous session entered the system 300. Accordingly, the variable "$\Delta t$" represents the time that has elapsed between the time that the previous session was requested and the time that the current session was requested. Upon reading the present application, one skilled in the art can easily associate the variable "TimeOfLastMetering" with a particular source (i.e. a specific user or organization) that requested a session at the time identified by the variable. For example, in an Internet application, the variable could be associated with the particular source by evaluating the source address contained in the header of the relevant data packet. In addition, upon reading the present specification, one skilled in the art could further associate the variable "TimeOfLastMetering" with other entities (e.g. the entity that is intended to receive the corresponding data packet) and/or with a specific event (e.g. an event corresponding to the requested session).

In operation 520, a variable "AddTokens" is calculated based on the variable "$\Delta t$" and a variable "cir". In one example, the variable "cir" is a constant that has a value that corresponds to the rate at which the particular account typically creates new sessions or process flows, otherwise to be known as the committed information rate ("cir"). For instance, the value of the variable "cir" could be less for a single user account than for an account for an organization. The variable "AddTokens" is determined based on product of the variables "Δt" and "cir". Since the variable "Δt" corresponds to the time between requests to create sessions and the variable "cir" corresponds to the rate at which a particular account can create new sessions, the variable "AddTokens" corresponds to the number of tokens to be added to the previously available tokens allocated to a particular account.

For example, if the variable "Δt" has a large value, the duration between the current request for a new session and the previous request for a new session is relatively to large. In other words, the owner of the account has not been requesting new sessions very frequently. On the other hand, if the variable "Δt" has a small value, the duration between the current request for a new session and the previous request for a new session is relatively small. In other words, the owner of the account has been requesting new sessions very frequently.

Since the variable "AddTokens" is directly proportional to the variable "Δt", when the owner of the account requests new sessions less frequently (i.e. when the value of the variable "Δt" is large), the value of the variable "AddTokens" is larger, and the number of tokens added to the available tokens for the particular account is increased. On the other hand, when the owner of the account requests new sessions more frequently (i.e. when the value of the variable "Δt" is small), the value of the variable "AddTokens" is smaller, and the number of tokens added to the available tokens for the particular account is smaller.

Similarly, if the variable "cir" has a large value, the account is authorized to create new sessions at a relatively high rate. On the other hand, if the variable "cir" has a small value, the account is only authorized to create new sessions at a relatively low rate.

The variable "AddTokens" is also directly proportional to the variable "cir". Thus, when the owner of the account has the authority to request new sessions more frequently (i.e. when the value of the variable "cir" is large), the value of the variable "AddTokens" is larger, and the number of tokens added to the available tokens for the particular account is increased. On the other hand, when the owner of the account has the authority to request new sessions less frequently (i.e. when the value of the variable "cir" is small), the value of the variable "AddTokens" is smaller, and the number of tokens added to the available tokens for the particular account is smaller.

Subsequently, operation 525 calculates a variable "AvailableTokens", which corresponds to the number of available tokens that is allocated to a particular account. In one implementation, the variable "AvailableTokens" is initialized and set to a predetermined value via a separate routine (not shown). More specifically the initial value of the variable "AvailableTokens" may be set to a variable "cbs". In one implementation, the variable "cbs" is a constant that corresponds to the maximum number of sessions permitted by the ISP node during a burst of new sessions, otherwise referred to as committed burst size ("cbs"). In any event, in operation 525, the variable "AvailableTokens" is set equal to the sum of the existing value of "AvailableTokens" and the variable "AddTokens".

Then, in operation 530, the system 300 determines whether or not the variable "AvailableTokens" is greater than or equal to the variable "cbs". If the variable "AvailableTokens" is greater than or equal to the variable "cbs", the variable "AvailableTokens" is set equal to the variable "cbs" (operation 535), and the routine proceeds to operation 540. On the other hand, if the variable "AvailableTokens" is less than the variable "cbs", the routine proceeds directly to operation 540.

Operations 525, 530, and 535 set the variable "AvailableTokens" to the minimum of (1) the sum of the previous value of the variable "AvailableTokens" and the variable "AddTokens" and (2) the variable "cbs". Thus, the system 300 is capable of handling both the steady state commitment for opening new sessions as well as handling burst requests for new sessions. Furthermore, the system 300 can handle the steady state opening of new sessions and the burst requests for new sessions while controlling the rate at which a particular user or organization opens sessions.

In operation 540, the value of the variable "AvailableTokens" is compared with the value of the variable "nTokens". If the value of the variable "AvailableTokens" is equal to or greater then the value of the variable "nTokens", the system 300 determines that the particular user or organization contains enough available tokens to "buy" the bandwidth for the newly requested session. In such case, the value of the variable "AvailableTokens" is decreased by the value of the variable "nTokens". (Operation 545). In other words, when the system permits the session to open or continue, the "cost" of the session (i.e. the predetermined number of tokens ("nTokens") for the session) is deducted from the number of tokens currently available for use by the user or the organization. Moreover, the session is deemed to be permitted, and a variable "Flag" is set to "green", which effectively raises a green flag for the session to proceed (operation 550).

However, if the value of the variable "AvailableTokens" is less than the value of the variable "nTokens" in operation 540, the system 300 determines that the user or the organization is currently attempting to create more sessions than they are permitted to use in a burst or steady state mode. In such case, the variable "Flag" is set to "red", effectively raising a "red" flag or indication that the new session is not permitted and may not continue. (Operation 555).

After the variable "Flag" is set to "green" or "red" in operation 550 or 555, the variable "TimeOfLastMetering" is set equal to the variable "TimeNow". (Operation 560). Then, the subroutine is ready to return the flag indication to the calling routine. (Operation 565).

Returning to the flow chart 400 in FIG. 4, operation 420 determines whether or not a "green" or "red" flag has been generated in operation 410. If a "green" flag has been generated, the system 300 allows the session to be created or to continue. (Operation 430). In such case, the system 300 allows the data packet to proceed and creates a new process flow or session corresponding to the data packet.

On the other hand, if a "red" flag has been generated in operation 410, the system does not allow the session to be created or to continue. (Operation 440). In order to prevent a session from opening or continuing, the data packet representing the session must be discarded. In a typical scenario, the initiator of the discarded data packet eventually reissues the packet at a later time to try to create the desired session again. An illustrative, non-limiting example of a system and method for discarding data packets is described in U.S. application Ser. No. 09/717,290 entitled "A Method and Apparatus for Process Flow Random Early Discard in Service Aware Networking Systems". The '290 application was filed on Nov. 22, 2000, assigned to the assignee of the present application, and is incorporated herein by reference in its entirety for all purposes. When the initiator resends the data packet re-requesting that the new session be created, the process described is repeated to determine whether or not the session should be allowed.

In one implementation of the embodiment above, the variables "Δt", "nTokens", "TimeNow", "TimeOfLastMetering", "cir", "AddTokens", "AvailableTokens", and "cbs" are whole numbers or integers. However, the present invention is not limited to such an arrangement, and one or more of the variables above can be real numbers.

Also, as described above, the operation 410 determines whether or not a new session or process flow is allowed and returns a "red" or "green" flag based on whether or not the session can continue or be opened. However, the present invention is clearly not limited to such an arrangement. For example, additional indicators besides the "red" and "green" flags may be added to more precisely indicate various possibilities of operation or alerts. For example, upon reading the present application, one skilled in the art would know how to modify operation 410 to return a "yellow" flag when a particular user is close to exceeding, but has not yet exceeded, the number of new sessions that he or she is able to open or create.

Furthermore, in the embodiment above, the variable "nTokens" is used to correspond to a number of tokens that are required to open a new session. However, instead of the variable "nTokens", another variable may be used that corresponds to a number of packets, bytes, bits, or other unit of measurement needed to open a session.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. A method of controlling a number of sessions established on a communication network, comprising:
   (a) inputting at least a first data packet transmitted on the communication network;
   (b) determining a new session corresponding to the at least the first data packet, wherein the new session is requested by at least a first user and wherein the at least the first user has an account authorizing the at least the first user to establish sessions on the communication network;
   (c) determining if a creation of the new session would exceed a permitted usage of the communication network, wherein the permitted usage corresponds to the account;
   (d) if the creation of the new session would exceed the permitted usage, preventing the new session from being created; and
   (e) if the creation of the new session would not exceed the permitted usage, allowing the new session to be created,
   wherein the operation (c) comprises:
   (c1) determining an elapsed time from when a previous session corresponding to the account is requested and when the new session is requested,
   wherein a probability that the creation of the new session would not exceed the permitted usage is directly related to the elapsed time.

2. The method as claimed in claim 1, wherein the at least the first user corresponds to a single user who has the account.

3. The method as claimed in claim 1, wherein the at least the first user corresponds to an organization of a plurality of users and wherein the organization has the account.

4. The method as claimed in claim 1, wherein the operation (c) comprises:
   (c2) determining a session rate value that corresponds to a rate at which the account is authorized to create sessions,
   wherein a probability that the creation of the new session would not exceed the permitted usage is directly related to a product of the elapsed time and the session rate value.

5. A method of controlling a number of sessions established on a communication network, comprising:
   (a) inputting at least a first data packet transmitted on the communication network;
   (b) determining a new session corresponding to the at least the first data packet, wherein the new session is requested by at least a first user and wherein the at least the first user has an account authorizing the at least the first user to establish sessions on the communication network;
   (c) determining if a creation of the new session would exceed a permitted usage of the communication network, wherein the permitted usage corresponds to the account;
   (d) if the creation of the new session would exceed the permitted usage, preventing the new session from being created; and
   (e) if the creation of the new session would not exceed the permitted usage, allowing the new session to be created,
   wherein the operation (c) comprises:
   (c1) determining a session rate value that corresponds to a rate at which the account is authorized to create sessions,
   wherein a probability that the creation of the new session would not exceed the permitted usage is directly related to the session rate value.

6. A method of controlling a number of sessions established on a communication network, comprising:
   (a) inputting at least a first data packet transmitted on the communication network;
   (b) determining a new session corresponding to the at least the first data packet, wherein the new session is requested by at least a first user and wherein the at least the first user has an account authorizing the at least the first user to establish sessions on the communication network;
   (c) determining if a creation of the new session would exceed a permitted usage of the communication network, wherein the permitted usage corresponds to the account;
   (d) if the creation of the new session would exceed the permitted usage, preventing the new session from being created; and
   (e) if the creation of the new session would not exceed the permitted usage, allowing the new session to be created,
   wherein the operation (c) comprises:
   (c1) determining an elapsed time from when a previous session corresponding to the account is requested and when the new session is requested;

(c2) determining a session rate value that corresponds to a rate at which the account is authorized to create sessions; and (c3) determining an AvailableTokens value, wherein the AvailableTokens value is directly related to a product of the elapsed time and the session rate value and is directly related to a probability that the creation of the new session would not exceed the permitted usage.

7. The method as claimed in claim 6, wherein the operation (c) further comprises:

(c4) determining if the AvailableTokens value is greater than an nTokens value, wherein an nTokens value is a value relating to a cost of establishing the new session;

(c5) if the AvailableTokens value is greater than the nTokens value, determining that the creation of the new session would not exceed the permitted usage; and (c6) if the AvailableTokens value is less than the nTokens value, determining that the creation of the new session would exceed the permitted usage.

8. The method as claimed in claim 7, wherein an AddTokens value is directly related to a product of the elapsed time and the session rate value, and wherein the AvailableTokens value is directly related to a sum of at least the AddTokens value and a previous value of the AvailableTokens value.

9. The method as claimed in claim 8, wherein the operation (c3) comprises:

(c3a) determining an AvailableTokens value;

(c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and (c3c) if the AvailableTokens value is less than the committed burst size value, having the AvailableTokens value correspond to the sum of at least the AddTokens value and the previous value of the AvailableTokens value.

10. The method as claimed in claim 9, wherein the operation (c5) further comprises:

(c5a) if the AvailableTokens value is greater than the nTokens value, setting the AvailableTokens value equals to a new value corresponding to a difference between an existing value of the AvailableTokens value and the nTokens value.

11. The method as claimed in claim 8, wherein the operation (c5) further comprises:

(c5a) if the AvailableTokens value is greater than the nTokens value, setting the AvailableTokens value equal to a new value corresponding to a difference between an existing value of the AvailableTokens value and the nTokens value.

12. The method as claimed in claim 7, wherein the operation (c3) comprises:

(c3a) determining an AvailableTokens value;

(c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions;

and (c3c) if the AvailableTokens value is less than the committed burst size value, having the AvailableTokens value be directly related to the product of the elapsed time and the session rate value.

13. The method as claimed in claim 7, wherein the nTokens value is the same for all types of sessions that can potentially be established on the communication network.

14. The method as claimed in claim 7, wherein the nTokens value corresponds to an amount of bandwidth required to establish the new session.

15. The method as claimed in claim 7, wherein the nTokens value corresponds to a lifetime of the new session.

16. The method as claimed in claim 7, wherein the nTokens value corresponds to an amount of system resources required by the new session.

17. The method as claimed in claim 7, wherein the nTokens value corresponds to an importance of the new session.

18. The method as claimed in claim 6, wherein an AddTokens value is directly related to a product of the elapsed time and the session rate value, and wherein the AvailableTokens value is directly related to a sum of at least the AddTokens value and a previous value of the AvailableTokens value.

19. The method as claimed in claim 18, wherein the operation (c3) comprises:

(c3a) determining an AvailableTokens value;

(c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and (c3c) if the AvailableTokens value is less than the committed burst size value, having the AvailableTokens value correspond to the sum of at least the AddTokens value and the previous value of the AvailableTokens value.

20. The method as claimed in claim 6, wherein the operation (c3) comprises:

(c3a) determining an AvailableTokens value;

(c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and (c3c) if the AvailableTokens value is less than the committed burst size value, having the AvailableTokens value be directly related to the product of the elapsed time and the session rate value.

21. A software program contained on a computer readable medium for controlling a number of sessions established on a communication network, wherein the software program includes instructions to instruct a controller to perform a routine comprising:

(a) inputting at least a first data packet transmitted on the communication network;

(b) determining a new session corresponding to the at least the first data packet, wherein the new session is requested by at least a first user and wherein the at least the first user has an account authorizing the at least the first user to establish sessions on the communication network;

(c) determining if a creation of the new session would exceed a permitted usage of the communication network, wherein the permitted usage corresponds to the account;

(d) if the creation of the new session would exceed the permitted usage, preventing the new session from being created; and
(e) if the creation of the new session would not exceed the permitted usage, allowing the new session to be created, wherein the operation (c) comprises:

(c1) determining an elapsed time from when a previous session corresponding to the account is requested and when the new session is requested, wherein a probability that the creation of the new session would not exceed the permitted usage is directly related to the elapsed time.

22. The software program as claimed in claim 21, wherein the at least the first user corresponds to a single user who has the account.

23. The software program as claimed in claim 21, wherein the at least the first user corresponds to an organization of a plurality of users and wherein the organization has the account.

24. The software program as claimed claim 21, wherein the operation (c) comprises:

(c2) determining a session rate value that corresponds to a rate at which the account is authorized to create sessions, wherein a probability that the creation of the new session would not exceed the permitted usage is directly related to a product of the elapsed time and the session rate value.

25. A software program contained on a computer readable medium for controlling a number of sessions established on a communication network, wherein the software program includes instructions to instruct a controller to perform a routine comprising:

(a) inputting at least a first data packet transmitted on the communication network;
(b) determining a new session corresponding to the at least the first data packet, wherein the new session is requested by at least a first user and wherein the at least the first user has an account authorizing the at least the first user to establish sessions on the communication network;
(c) determining if a creation of the new session would exceed a permitted usage of the communication network, wherein the permitted usage corresponds to the account;
(d) if the creation of the new session would exceed the permitted usage, preventing the new session from being created; and
(e) if the creation of the new session would not exceed the permitted usage, allowing the new session to be created, wherein the operation (c) comprises:

(c1) determining a session rate value that corresponds to a rate at which the account is authorized to create sessions, wherein a probability that the creation of the new session would not exceed the permitted usage is directly related to the session rate value.

26. A software program contained on a computer readable medium for controlling a number of sessions established on a communication network, wherein the software program includes instructions to instruct a controller to perform a routine comprising:

(a) inputting at least a first data packet transmitted on the communication network;
(b) determining a new session corresponding to the at least the first data packet, wherein the new session is requested by at least a first user and wherein the at least the first user has an account authorizing the at least the first user to establish sessions on the communication network;
(c) determining if a creation of the new session would exceed a permitted usage of the communication network, wherein the permitted usage corresponds to the account;
(d) if the creation of the new session would exceed the permitted usage, preventing the new session from being created; and
(e) if the creation of the new session would not exceed the permitted usage, allowing the new session to be created, wherein the operation (c) comprises:

(c1) determining an elapsed time from when a previous session corresponding to the account is requested and when the new session is requested;
(c2) determining a session rate value that corresponds to a rate at which the account is authorized to create sessions; and
(c3) determining an AvailableTokens value, wherein the AvailableTokens value is directly related to a product of the elapsed time and the session rate value and is directly related to a probability that the creation of the new session would not exceed the permitted usage.

27. The software program as claimed in claim 26, wherein the operation (c) further comprises:

(c4) determining if the AvailableTokens value is greater than an nTokens value, wherein an nTokens value is a value relating to a cost of establishing the new session;
(c5) if the AvailableTokens value is greater than the nTokens value, determining that the creation of the new session would not exceed the permitted usage; and
(c6) if the AvailableTokens value is less than the nTokens value, determining that the creation of the new session would exceed the permitted usage.

28. The software program as claimed in claim 27, wherein an AddTokens value is directly related to a product of the elapsed time and the session rate value, and wherein the AvailableTokens value is directly related to a sum of at least the AddTokens value and a previous value of the AvailableTokens value.

29. The software program as claimed in claim 28, wherein the operation (c3) comprises:

(c3a) determining an AvailableTokens value;
(c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and
(c3c) if the AvailableTokens value is less than the committed burst size value, having the AvailableTokens value correspond to the sum of at least the AddTokens value and the previous value of the AvailableTokens value.

30. The software program as claimed in claim 29, wherein the operation (c5) further comprises:

(c5a) if the AvailableTokens value is greater than the nTokens value, setting the AvailableTokens value equals to a new value corresponding to a difference between an existing value of the AvailableTokens value and the nTokens value.

31. The software program as claimed in claim 28, wherein the operation (c5) further comprises:
- (c5a) if the AvailableTokens value is greater than the nTokens value, setting the AvailableTokens value equal to a new value corresponding to a difference between an existing value of the AvailableTokens value and the nTokens value.

32. The software program as claimed in claim 27, wherein the operation (c3) comprises:
- (c3a) determining an AvailableTokens value;
- (c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and
- (c3c) if the AvailableTokens value is less than the committed burst size value, having the AvailableTokens value be directly related to the product of the elapsed time and the session rate value.

33. The software program as claimed in claim 27, wherein the nTokens value is the same for all types of sessions that can potentially be established on the communication network.

34. The software program as claimed in claim 27, wherein the nTokens value corresponds to an amount of bandwidth required to establish the new session.

35. The software program as claimed in claim 27, wherein the nTokens value corresponds to a lifetime of the new session.

36. The software program as claimed in claim 27, wherein the nTokens value corresponds to an amount of system resources required by the new session.

37. The software program as claimed in claim 27, wherein the nTokens value corresponds to an importance of the new session.

38. The software program as claimed in claim 26, wherein an AddTokens value is directly related to a product of the elapsed time and the session rate value, and wherein the AvailableTokens value is directly related to a sum of at least the AddTokens value and a previous value of the AvailableTokens value.

39. The software program as claimed in claim 38, wherein the operation (c3) comprises:
- (c3a) determining an AvailableTokens value;
- (c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and
- (c3c) if the AvailableTokens value is less than the committed burst size value, having the AvailableTokens value correspond to the sum of at least the AddTokens value and the previous value of the AvailableTokens value.

40. The software program as claimed in claim 26, wherein the operation (c3) comprises:
- (c3a) determining an AvailableTokens value;
- (c3b) if the AvailableTokens value is greater than a committed burst size value, having the AvailableTokens value correspond to the committed burst size value, wherein the committed burst size value corresponds to a maximum number of sessions permitted by a node of the communication network during a burst of new sessions; and
- (c3c) if the AvailableTokens value is less than the committed burst size value, having the AvailableTokens value be directly related to the product of the elapsed time and the session rate value.

41. A system for controlling a number of sessions established on a communication network, comprising:
- an interface that inputs at least a first data packet transmitted on the communication network; and
- a controller that receives the at least the first data packet, wherein the controller determines a new session corresponding to the at least the first data packet,
- wherein the new session is requested by at least a first user and wherein the at least the first user has an account, which is at least indirectly set up with the controller and which authorizes the at least the first user to establish sessions on the communication network,
- wherein the controller determines if a creation of the new session would exceed a permitted usage of the communication network,
- wherein the permitted usage corresponds to the account, wherein, if the creation of the new session would exceed the permitted usage, the controller prevents the new session from being created, and
- wherein, if the creation of the new session would not exceed the permitted usage, the controller allows the new session to be created,
- wherein the controller determines an elapsed time from when a previous session corresponding to the account is requested and when the new session is requested,
- wherein a probability that the creation of the new session would not exceed the permitted usage is directly related to the elapsed time.

42. The system as claimed in claim 41, wherein the at least the first user corresponds to a single user who has the account.

43. The system as claimed in claim 41, wherein the at least the first user corresponds to an organization of a plurality of users and wherein the organization has the account.

44. The system as claimed in claim 41,
- wherein the controller determines a session rate value that corresponds to a rate at which the account is authorized to create sessions,
- wherein a probability that the creation of the new session would not exceed the permitted usage is directly related to a product of the elapsed time and the session rate value.

45. A system for controlling a number of sessions established on a communication network, comprising:
- an interface that inputs at least a first data packet transmitted on the communication network; and
- a controller that receives the at least the first data packet, wherein the controller determines a new session corresponding to the at least the first data packet,
- wherein the new session is requested by at least a first user and wherein the at least the first user has an account, which is at least indirectly set up with the controller and which authorizes the at least the first user to establish sessions on the communication network,
- wherein the controller determines if a creation of the new session would exceed a permitted usage of the communication network,
- wherein the permitted usage corresponds to the account, wherein, if the creation of the new session would exceed the permitted usage, the controller prevents the new session from being created, and wherein, if the creation of the new session would not exceed the permitted usage, the controller allows the new session to be created, wherein the controller determines a session rate value that corresponds to a rate at which the account is authorized to create sessions, wherein a probability that the creation of the new session would not exceed the permitted usage is directly related to the session rate value.

46. A system for controlling a number of sessions established on a communication network, comprising:

an interface that inputs at least a first data packet transmitted on the communication network; and a controller that receives the at least the first data packet, wherein the controller determines a new session corresponding to the at least the first data packet, wherein the new session is requested by at least a first user and wherein the at least the first user has an account, which is at least indirectly set up with the controller and which authorizes the at least the first user to establish sessions on the communication network, wherein the controller determines if a creation of the new session would exceed a permitted usage of the communication network, wherein the permitted usage corresponds to the account, wherein, if the creation of the new session would exceed the permitted usage, the controller prevents the new session from being created, and wherein, if the creation of the new session would not exceed the permitted usage, the controller allows the new session to be created, wherein the controller determines an elapsed time from when a previous session corresponding to the account is requested and when the new session is requested, wherein the controller determines a session rate value that corresponds to a rate at which the account is authorized to create sessions, and wherein the controller determines an AvailableTokens value, wherein the AvailableTokens value is directly related to a product of the elapsed time and the session rate value and is directly related to a probability that the creation of the new session would not exceed the permitted usage.

47. The system as claimed in claim 46, wherein the controller determines if the AvailableTokens value is greater than an nTokens value, wherein an nTokens value is a value relating to a cost of establishing the new session, wherein, if the Available-Tokens value is greater than the nTokens value, the controller determines that the creation of the new session would not exceed the permitted usage, and wherein, if the AvailableTokens value is less than the nTokens value, the controller determines that the creation of the new session would exceed the permitted usage.

48. The system as claimed in claim 47, wherein an AddTokens value is directly related to a product of the elapsed time and the session rate value, and wherein the AvailableTokens value is directly related to a sum of at least the AddTokens value and a previous value of the AvailableTokens value.

49. The system as claimed in claim 48, wherein the controller determines an AvailableTokens value;

wherein, if the AvailableTokens value is greater than a committed burst size value, the controller has the AvailableTokens value correspond to the committed burst size value, wherein the committed burst size value corresponds to a maximum number of sessions permitted by a node of the communication network during a burst of new sessions, and wherein, if the AvailableTokens value is less than the committed burst size value, the controller has the AvailableTokens value correspond to the sum of at least the AddTokens value and the previous value of the AvailableTokens value.

50. The system as claimed in claim 49, wherein, if the AvailableTokens value is greater than the nTokens value, the controller sets the AvailableTokens value equal to a new value corresponding to a difference between an existing value of the AvailableTokens value and the nTokens value.

51. The system as claimed in claim 48, wherein, if the AvailableTokens value is greater than the nTokens value, the controller sets the AvailableTokens value equal to a new value corresponding to a difference between an existing value of the AvailableTokens value and the nTokens value.

52. The system as claimed in claim 47, wherein the controller determines an AvailableTokens value;

wherein, if the AvailableTokens value is greater than a committed burst size value, the controller has the AvailableTokens value correspond to the committed burst size value, wherein the committed burst size value corresponds to a maximum number of sessions permitted by a node of the communication network during a burst of new sessions, and wherein, if the AvailableTokens value is less than the committed burst size value, the controller has the AvailableTokens value be directly related to the product of the elapsed time and the session rate value.

53. The system as claimed in claim 47, wherein the nTokens value is the same for all types of sessions that can potentially be established on the communication network.

54. The system as claimed in claim 47, wherein the nTokens value corresponds to an amount of bandwidth required establishing the new session.

55. The system as claimed in claim 47, wherein the nTokens value corresponds to a lifetime of the new session.

56. The system as claimed in claim 47, wherein the nTokens value corresponds to an amount of system resources required by the new session.

57. The system as claimed in claim 47, wherein the nTokens value corresponds to an importance of the new session.

58. The system as claimed in claim 46, wherein an AddTokens value is directly related to a product of the elapsed time and the session rate value, and wherein the AvailableTokens value is directly related to a sum of at least the AddTokens value and a previous value of the AvailableTokens value.

59. The system as claimed in claim 58, wherein the controller determines an AvailableTokens value;

wherein, if the AvailableTokens value is greater than a committed burst size value, the controller has the AvailableTokens value correspond to the committed burst size value, wherein the committed burst size value corresponds to a maximum number of sessions permitted by a node of the communication network during a burst of new sessions, and wherein, if the AvailableTokens value is less than the committed burst size value, the controller has the AvailableTokens value correspond to the sum of at least the AddTokens value and the previous value of the AvailableTokens value.

60. The system as claimed in claim 46, wherein the controller determines an AvailableTokens value, wherein, if the AvailableTokens value is greater than a committed burst size value, the controller has the AvailableTokens value correspond to the committed burst size value, wherein the committed burst size value corresponds to a maximum number of sessions permitted by a node of the communication network during a burst of new sessions, and wherein, if the AvailableTokens value is less than the committed burst size value, the controller has the AvailableTokens value be directly related to the product of the elapsed time and the session rate value.

* * * * *